US008024773B2

(12) United States Patent
Butler et al.

(10) Patent No.: US 8,024,773 B2
(45) Date of Patent: Sep. 20, 2011

(54) INTEGRATED GUIDANCE AND VALIDATION POLICY BASED ZONING MECHANISM

(75) Inventors: Eric Kevin Butler, San Jose, CA (US); Pi-Wei Chin, Sunnyvale, CA (US); Scott Joseph Colbeck, San Jose, CA (US); Kaladhar Voruganti, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1021 days.

(21) Appl. No.: 11/866,749

(22) Filed: Oct. 3, 2007

(65) Prior Publication Data

US 2009/0094664 A1   Apr. 9, 2009

(51) Int. Cl.
G06F 17/00 (2006.01)
H04L 29/06 (2006.01)

(52) U.S. Cl. .......................................... 726/1; 709/220
(58) Field of Classification Search ........ 726/1; 709/220, 709/223–224, 227, 230, 217–219
See application file for complete search history.

(56) References Cited

U.S. PATENT DOCUMENTS

| 6,920,494 | B2 | 7/2005 | Heitman et al. | |
| 7,130,621 | B2 | 10/2006 | Blawat et al. | |
| 7,194,538 | B1 * | 3/2007 | Rabe et al. | 709/224 |
| 2004/0034746 | A1 * | 2/2004 | Horn et al. | 711/141 |
| 2004/0078599 | A1 | 4/2004 | Nahum | |
| 2005/0091353 | A1 | 4/2005 | Gopisetty et al. | |
| 2006/0036822 | A1 * | 2/2006 | Kaji | 711/163 |
| 2007/0067589 | A1 * | 3/2007 | Mishra et al. | 711/163 |
| 2008/0313658 | A1 * | 12/2008 | Cagno et al. | 719/326 |

* cited by examiner

*Primary Examiner* — Eleni A Shiferaw
*Assistant Examiner* — Jing Sims
(74) *Attorney, Agent, or Firm* — Stephen R. Tkacs; Stephen J. Walder, Jr.; Feb R. Cabrasawan

(57) ABSTRACT

A mechanism is provided to automatically retrieve zoning best practices from a centralized repository and to ensure that automatically generated zones do not violate these best practices. A user selects a set of hosts and storage controllers. The user also selects a guidance policy for creating the zone, and also selects a set of validation policies that must be enforced on the zone. If the user selects a guidance policy and a validation policy combination that is incompatible, the mechanism allows the user to change either the selected guidance policy or the set of validation policies. If the user has selected consistent-zoning as a guidance policy, then the mechanism automatically selects a guidance policy that does not violate the known validation policies.

15 Claims, 4 Drawing Sheets

INTEGRATED GUIDANCE AND VALIDATION POLICY BASED ZONING MECHANISM

BACKGROUND

1. Technical Field

The present application relates generally to an improved data processing system and method. More specifically, the present application is directed to a system and mechanism for integrated guidance and validation zoning of devices, such as serial attached SCSI (SAS) devices, for example, in a storage area network (SAN).

2. Description of Related Art

Storage area networks, or SANs, consist of multiple storage devices connected by one or more fabrics. Storage devices can be of two types: host systems that access data, and storage subsystems that are providers of data. Zoning is a network-layer access control mechanism that dictates which storage subsystems are visible to which host systems. This access control mechanism is useful in scenarios where the storage area network is shared across multiple administrative or functional domains. Such scenarios are common in large installations of storage area networks, such as those found in storage service providers.

The current approach to zoning storage area networks is manual and involves correlating information from multiple sources to achieve the desired results. For example, if a system administrator wants to put multiple storage devices in one zone, the system administrator has to identify all the ports belonging to the storage devices, verify the fabric connectivity of these storage devices to determine the intermediate switch ports and input all this assembled information into the zone configuration utility provided by the fabric manufacturer. This manual process is very error-prone because storage devices or switch ports are identified by a 16-byte hexadecimal notation that is not easy to remember or manipulate. Furthermore, the system administrator has to also do a manual translation of any zoning policy to determine the number of zones as well as the assignment of storage devices to zones.

One technology that is being used more prevalently with storage area networks is Serial Attached SCSI (SAS) communication protocol technology. SAS is a computer bus technology primarily designed for transfer of data to and from devices such as hard drives, CD-ROM drives, tape storage devices, and the like. SAS is a serial communication protocol for direct attached storage (DAS) devices. It is designed for the corporate and enterprise market as a replacement for parallel SCSI, allowing for much higher speed data transfers than previously available, and is backwards-compatible with serial advanced technology attachment (SATA) drives. Though SAS uses serial communication instead of the parallel method found in traditional SCSI devices, it still uses SCSI commands for interacting with SAS end devices.

Fibre Channel is a high-speed transport technology used to build storage area networks. Although Fibre Channel can be used as a general-purpose network carrying asynchronous transfer mode (ATM), Internet Protocol (IP) and other protocols, it is primarily used for transporting SCSI traffic from servers to disk arrays. The Fibre Channel Protocol (FCP) serializes SCSI commands into Fibre Channel frames. IP, however, may be used for in-band simple network management protocol (SNMP) network management. Fibre Channel can be configured point-to-point, via a switched topology or in an arbitrated loop (FC-AL) with or without a hub.

In the Fibre Channel domain, one typically uses port unique identifiers, referred to as world wide names (WWNs), to create a zone. WWNs are 16 byte identifiers, and, therefore, users make many transcribing related mistakes when creating a zone. Users may inadvertently allow a wrong host to see the wrong storage, or they may accidentally omit a host from seeing the required storage. Users may miss out on best practices, which ensure that the devices in the zone are operating correctly. Some example zoning related policies may dictate that host bus adapters (HBAs) from different venders should not to be used in the same zone because they can cause incorrect operation for the devices in the zone, that there should not be more than a predetermined number of zones in a fabric, that there should not be more than a predetermined number of zone members in a zone, or that hosts having different operating systems should not be in the same zone.

Zoning in a storage area network is particularly difficult. Typically, the zoning is a two step mapping where each individual port, or "PHY," is assigned to a zone and then, as a subsequent step, each zone is added to a zone group. Storage area networks fabrics only allow one zone group to be active, so all the required zones must be part of the active or loaded zone group. A complex storage area network may have several fabrics with several zones, each of which can be part of one or more zone groups. Zoning is increasingly being targeted at users or customers who do not necessarily have storage area network knowledge or skills and, thus, do not have the necessary background to perform the manual zoning of storage area networks. Thus, these users or customers required aids to help make the zoning of the storage area network easier.

SUMMARY

In one illustrative embodiment, a computer program product comprises a computer useable medium having a computer readable program. The computer readable program, when executed on a computing device, causes the computing device to receive a list of host ports and storage ports in a storage area network, receive a selection of a set of validation policies, receive a selection of a guidance policy for automatically creating a zone in the storage area network, determine whether a zone created using the selected guidance policy violates any of the set of validation policies based on the list of host ports and storage ports, and if none of the validation policies is violated, automatically create the zone in the storage area network using the selected guidance policy.

In another exemplary embodiment, the selected guidance policy is a consistent-zoning policy and determining whether a zone created using the selected guidance policy violates any of the set of validation policies comprises choosing a guidance policy with a largest zone granularity and determining whether a zone created using the guidance policy with the largest zone granularity violates any of the set of validation policies based on the list of host ports and storage ports.

In a still further exemplary embodiment, the computer readable program, when executed on the computing device, further causes the computing device to repeat choosing a guidance policy with a next smaller zone granularity and determining whether a zone created using the guidance policy with the next smaller zone granularity violates any of the set of validation policies based on the list of host ports and storage ports until a guidance policy and validation policy combination is found that does not result in a violation.

In a further exemplary embodiment, the computer readable program, when executed on the computing device, further causes the computing device to propose other combinations of guidance policies and validation policies for selection by a user if a guidance policy and validation policy combination that does not result in a violation cannot be found.

In another illustrative embodiment, a data processing system comprises a processor and a memory coupled to the processor. The memory contains instructions which, when executed by the processor, cause the processor to receive a list of host ports and storage ports in a storage area network, receive a selection of a set of validation policies, receive a selection of a guidance policy for automatically creating a zone in the storage area network, determine whether a zone created using the selected guidance policy violates any of the set of validation policies based on the list of host ports and storage ports, and if none of the validation policies is violated, automatically create the zone in the storage area network using the selected guidance policy.

In another exemplary embodiment, the selected guidance policy is a consistent-zoning policy and determining whether a zone created using the selected guidance policy violates any of the set of validation policies comprises choosing a guidance policy with a largest zone granularity and determining whether a zone created using the guidance policy with the largest zone granularity violates any of the set of validation policies based on the list of host ports and storage ports.

In yet another illustrative embodiment, a method for zoning a storage area network comprises receiving a list of host ports and storage ports in a storage area network, receiving a selection of a set of validation policies, receiving a selection of a guidance policy for automatically creating a zone in the storage area network, determining whether a zone created using the selected guidance policy violates any of the set of validation policies based on the list of host ports and storage ports, and if none of the validation policies is violated, automatically creating the zone in the storage area network using the selected guidance policy.

In another exemplary embodiment, the selected guidance policy is a consistent-zoning policy and determining whether a zone created using the selected guidance policy violates any of the set of validation policies comprises choosing a guidance policy with a largest zone granularity and determining whether a zone created using the guidance policy with the largest zone granularity violates any of the set of validation policies based on the list of host ports and storage ports.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

The illustrative embodiments provide a system and method for automatically performing zoning of devices in a storage area network (SAN). For example, the zoning performed by the illustrative embodiments may be performed with regard to Serial Attached SCSI (SAS) devices or Fibre Channel devices within a SAN such that a selected guidance policy and a selected set of validation policies are satisfied. In order to provide a context for understanding the arrangement and operation of the illustrative embodiments, FIG. 1 is provided hereafter as one example of a SAN in which the mechanisms of the illustrative embodiments may be implemented.

It should be appreciated that while the illustrative embodiments will be described with regard to zoning of SAS devices using SAS expanders, the present invention is not limited to such. To the contrary, the mechanisms of the illustrative embodiments may be utilized with any SAN architecture and SAN devices in which zoning is utilized to control communication connection establishment and management between SAN devices. Since SAS is being utilized in the description of the illustrative embodiments, it is assumed that those of ordinary skill in the art are familiar with the SAS-2 standard promulgated by the Technical Committee T10. A copy of this standard is available at www.t10.org/ftp/t10/drafts/sas2/sas2r02.pdf.

Figure 1:
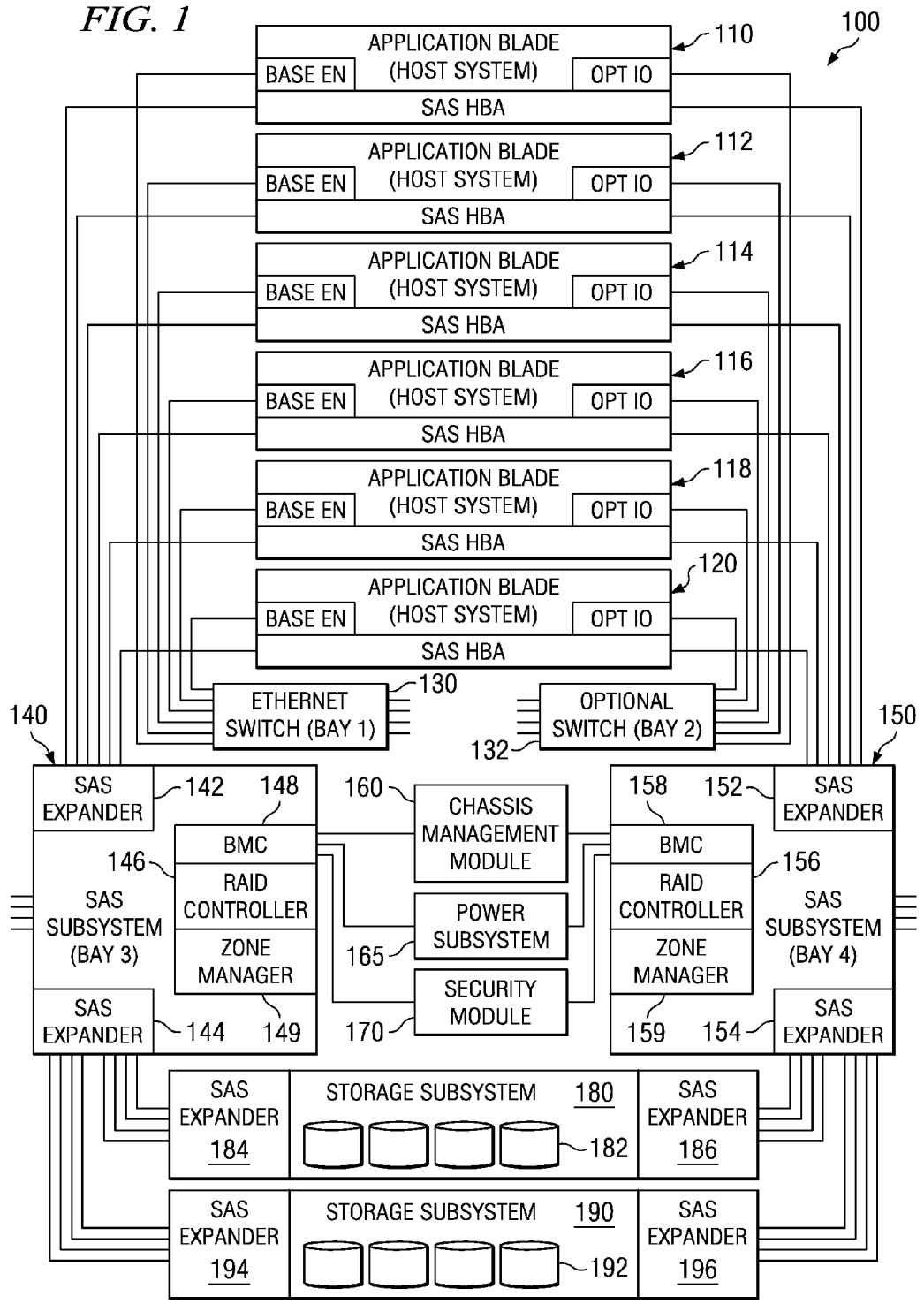
FIG. 1 is an exemplary diagram illustrating a storage area network in accordance with one illustrative embodiment.

With reference now to the figures, FIG. 1 is an exemplary diagram illustrating a storage area network (SAN) in accordance with one illustrative embodiment. As shown in FIG. 1, the SAN may be provided in a chassis 100, such as a BladeCenter™ chassis available from International Business Machines Corporation of Armonk, N.Y. Within chassis 100, a plurality of host servers or host systems may be provided on application blades 110-120. Each of host systems 110-120 may have one or more input/output adapters including a base Ethernet (base EN) adapter for communication with an Ethernet switch 130, an optional I/O (opt I/O) adapter for communication with an optional switch 132, and SAS host bus adapter (SAS HBA) for communication with SAS subsystems 140 and 150. In addition to these elements, a chassis management module 160, power subsystem 165, and security module 170 may be provided within the chassis 100 for performing various management, power, and security functions. The elements of the chassis 100 communicate with one another via a SAN fabric.

The SAN fabric may include connections, such as wired links, wireless communication links, fiber optic cables, or the like. The SAN fabric may utilize one or more communication protocols including, for example, Fibre Channel, Ethernet, or the like. In the depicted example, the SAN fabric uses Fibre Channel to communicate between the application blades 110-120 and the storage subsystems 180 and 190 via the SAS subsystems 140 and 150.

The SAS subsystems 140 and 150 operate as switches in the SAN fabric and controllers for accessing the storage subsystems 180 and 190. As shown in FIG. 1, the storage subsystems 180 and 190 are comprised of a plurality of storage devices 182 and 192, respectively, which are accessed via one or more SAS expanders 184, 186, 194, and 196. The storage devices 182 and 192 may comprise a single disk drive, tape drive, optical drive, or a plurality of such storage devices, such as in a disk array. For example, the storage subsystem 180 may comprise a disk array, such as a Redundant Array of Independent Disks (RAID) system with the disk devices in the RAID system being Just a Bunch of Disks (JBOD) devices and/or Switched Bunch of Disks (SBOD) systems.

The SAS subsystems 140 and 150 may themselves comprise a host side SAS expander 142, 152, and a storage subsystem side SAS expander 144, 154. The SAS expanders 142, 144, 152, 154, 184, 186, 194, and 196 operate in a manner similar to Ethernet hubs in a network, which allows multiple systems to be connected using a single switch port. The SAS expanders 142, 144, 152, 154, 184, 186, 194, and 196 may be configured to support zoning in accordance with the illustrative embodiments. The SAS expanders 142, 144, 152, 154, 184, 186, 194, and 196 may be provided in one or more zoned portions of a service delivery subsystem (ZPSDS). The SAS expanders 142, 144, 152, 154, 184, 186, 194, and 196 control whether a port, or PHY, of a storage subsystem 180 or 190, or host system 110-120, is permitted to participate in a connection with another port, or PHY, of another storage subsystem 180 or 190, or host system 110-120.

Moreover, the SAS subsystems 140 and 150 may further comprise storage subsystem controllers, such as RAID controllers 146 and 156, blade management controllers (BMC) 148 and 158, and at least one zone manager 149 and 159. While a plurality of zone managers 149 and 159 are shown in FIG. 1, it should be appreciated that only one zone manager, e.g., zone manager 149, may be actively managing the zones of the SAN at one time using the mechanisms of the illustrative embodiments, as described hereafter. The RAID controllers 146 and 156 perform various control operations for controlling operation and access to the storage subsystems 180 and 190. The BMCs 148 and 158 perform various management operations for managing the application blades 110-120 of the chassis 100. The BMCs 148 and 158 may communicate with the chassis management module 160 to obtain vital product data (VPD) for the various application blades 110-120 and storage subsystems 180 and 190.

Moreover, the BMCs 148 and 158 may perform discovery operations for discovering the position, i.e. the bay or drawer identifier, of the various application blades 110-120, the SAS subsystems 140 and 150, switches 130 and 132, and storage subsystems 180 and 190. The BMCs 148 and 158 perform discovery of position information within the chassis 100 by using well known chassis communication techniques such that the SAS subsystems 140 and 150 obtain vital product data (VPD) which is filled in by the chassis management module 160. This VPD has information regarding the host servers, whether the host servers are powered on or not, and the like. As a result, the SAS subsystem 140, 150 knows the chassis identifier of chassis 100 it is in, host servers 110-120 around the SAS subsystem 140, 150, storage devices in storage subsystems 180 and 190 on the chassis 100, and also which bay or drawer the SAS subsystem 140, 150 is in within the chassis 100. The BMC 148, 158 can then pass this information to the zone manager 149.

As shown in FIG. 1, the SAS subsystems 140 and 150, as well as the switches 130 and 132, have external ports for communicating with other devices outside of the chassis 100. These external devices may be part of the SAN as well, but may be provided in other chassis (not shown), coupled to the chassis 100 via an external data network (not shown), or the like. Discovery of the ports, or PHYs, associated with external data storage devices and host systems is generally covered in the SAS specification, revision 9, available from Technical Committee T10 at www.T10.org.

At the start of the zoning operation, the zone manager 149 of the SAN generates a list of ports, or PHYs, on the SAN, such as through the above discovery processes. During generation of this list of ports, or PHYs, the zone manager 149 determines which ports are associated with SAS end devices, i.e. storage devices or host system devices, that provide data storage, i.e. storage devices 182 and 192, which ports/PHYs are host systems, e.g., host servers on application blades 110-120, whether there are storage system controllers, e.g., RAID controllers 146 and 156, present in association with the end devices, and other hardware details. Therefore, a listing of host system ports and storage system ports/PHYs are both automatically available at the start of the operation of the mechanisms of the illustrative embodiments.

Additional information is available within the details of each port in each list. For example, the details for each port may identify whether the port is associated with a storage device that is part of an external Switched Bunch of Disks (SBOD) system, an internal Just a Bunch of Disks (JBOD) system, or the like. The zone manager 149 uses the information gathered in these lists through the discovery process to performs various zone management operations for automatically zoning the SAN in accordance with the illustrative embodiments as described hereafter.

Figure 2:
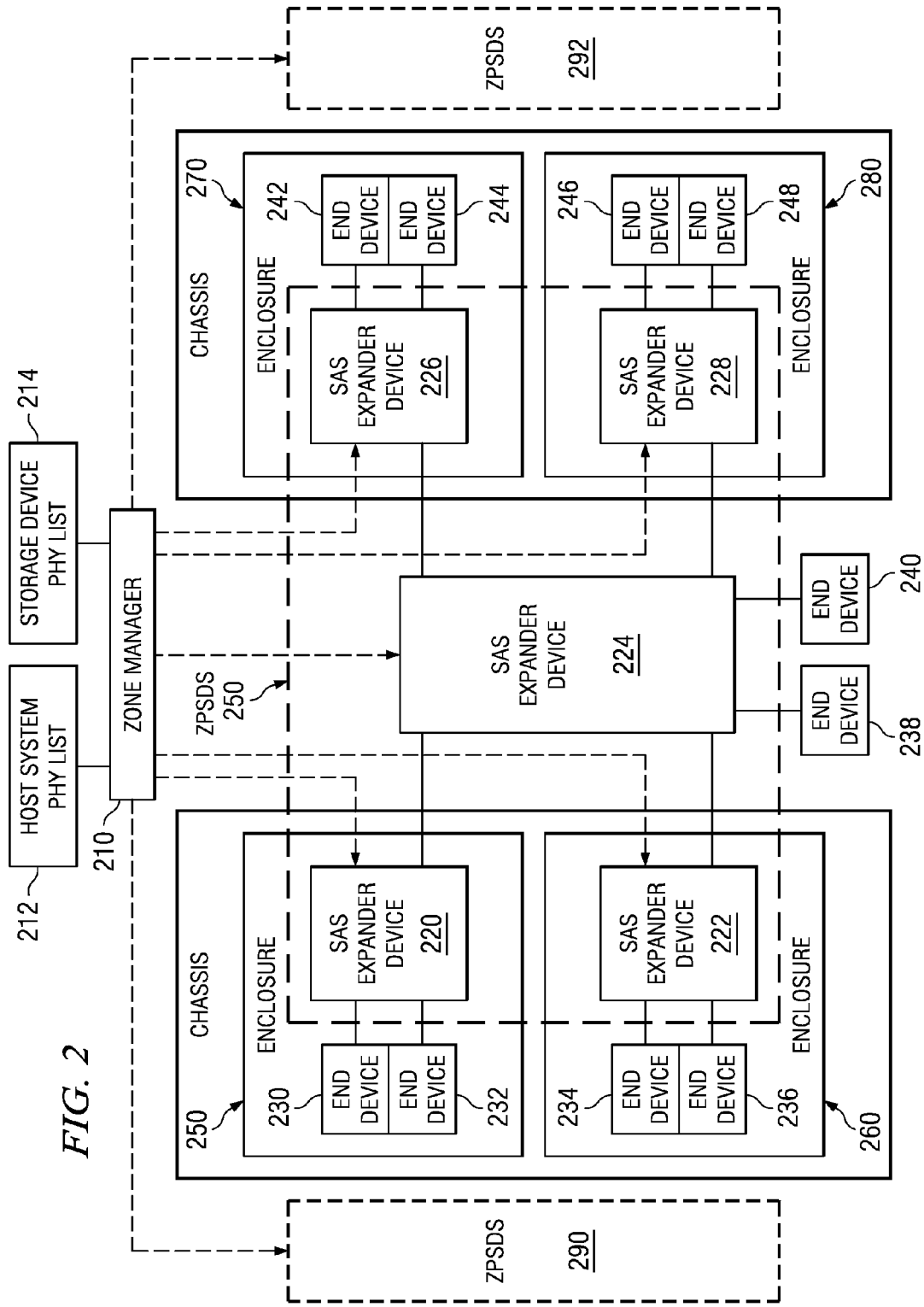
FIG. 2 is an exemplary diagram illustrating a storage area network in which a zone manager and SAS expanders are utilized in accordance with one illustrative embodiment.

FIG. 2 is an exemplary diagram illustrating a SAN in which a zone manager and SAS expanders are utilized in accordance with one illustrative embodiment. There are a number of possible configurations for a SAS based SAN with the depicted implementation being only one example. In the depicted example, the zone manager communicates directly with the SAS expander devices, however this is not a requirement. For example, the zone manager may be coupled to an end device through which the zone manager may communicate with the SAS expanders. Furthermore, the zone manager may communicate with each of the SAS expanders through another SAS expander and an end device. Thus, the zone manager may have access to an end device with a SAS port, or PHY, whose zone group has access to zone group 2, as discussed hereafter, or may have access to one or more SAS expander devices through a sideband interface, e.g., Ethernet or the like. Other configurations may be used with the mechanisms of the illustrative embodiments without departing from the spirit and scope of the present invention.

As shown in FIG. 2, the zone manager 210, which may be provided in a SAS subsystem of one of the chassis or a different chassis than those shown in FIG. 2, communicates with a plurality of SAS expander devices 220-228 which are in turn coupled to SAS end devices 230-248. The SAS end devices 230-248 may be provided in enclosures 260 and 280 of storage systems, such as host systems 110-118 in FIG. 1, for example. The host systems 110-118 may, or may not, have associated storage system controllers, such as RAID controllers or the like, provided in associated SAS subsystems, that control the transfer of data to/from the SAS end devices 230-248 via the SAS expander devices 220-228. The SAS expander devices 220-228 may be part of a zoned portion of a service delivery subsystem (ZPSDS) 250. The SAN structure may comprise a plurality of such ZPSDS 250, 290, and 292, having the same or different configurations of SAS expanders. Moreover, there may be multiple zone managers 210, such as one for each ZPSDS 250, 290, and 292. Zone manager 210 receives host system PHY list 212 and storage device PHY list 214.

The zone manager 210 assigns zone groups to all the ports, or PHYs, that are capable of participating in connections through the ZPSDS 250. Every PHY in a SAS domain may be assigned to a zone group. In the current SAS-2 specification, there is support for 128 zone groups numbered 0 through 127, although the present invention is not limited to 128 zone groups in order to operate properly. Zone group numbers are assigned to SAS expander devices 220-228 PHYs as part of the zone PHY information and are assigned to SAS addresses in the SAS expander routing table data structures, described hereafter.

Each PHY of a SAS expander device 220-228 supports the following zone PHY information: an "inside ZPSDS" bit, a "requested inside ZPSDS" bit, an "inside ZPSDS persistent" bit, a "zone group persistent" bit, and a "zone group" field. The "inside ZPSDS" bit indicates if the PHY is inside or on the boundary of a ZPSDS 250. An "inside ZPSDS" bit set to zero indicates that the PHY is attached to an end device, a SAS expander device that does not support zoning, or a SAS expander device with zoning disabled. An "inside ZPSDS" bit set to one indicates that the PHY is attached to a SAS expander device with zoning enabled and is thus, inside a ZPSDS 250. The "inside ZPSDS" bit is not directly changeable and only changes following a link reset sequence based on the "requested inside ZPSDS" bit, which is used to establish the boundary of the ZPSDS 250.

The "requested inside ZPSDS" bit is transmitted in an IDENTIFY address frame to the attached PHY and is used to determine the values of other zone PHY information fields after a link reset sequence. The "inside ZPSDS persistent" bit indicates the method used to determine the value of the "inside ZPSDS" bit after a link reset sequence and is transmitted in the IDENTIFY address frame. The "zone group" field contains a value in the range of 0 to 127 that specifies the zone group to which the PHY belongs. More information about this zone PHY information and the use of this information in a SAS based system may be found in the SAS-2 specification.

In accordance with the SAS-2 specification, a SAS expander device 220-228 PHY inside a ZPSDS 250 is assigned to zone group 1. A PHY attached to the boundary of the ZPSDS 250, i.e. attached to a SAS expander PHY with an "inside ZPSDS" bit set to zero, belongs to the zone group indicated by the zone group field of the SAS expander PHY to which it is attached. A PHY attached to one or more SAS expander devices beyond the boundary of the ZPSDS 250 belongs to a zone group if a "zone address resolved" bit is set to one in the boundary expander PHY and the SAS expander routing table data structure in the SAS expander device contains a "zone group value" for the PHY's SAS address. The zone groups assigned in one ZPSDS 250 have no relationships to zone groups assigned in another ZPSDS 290, 292.

Each SAS expander device 220-228 contains a zone permission table data structure that controls whether a connection is allowed between PHYs based on their zone groups. A requested connection is only established if the zone permission table indicates that access between the zone group of the source port, or PHY, and the zone group of the target port, or PHY, is allowed.

Tools may allow users to manually select different devices and then automate the task of creating a zone. This specifically addresses the problem of human error when transcribing WWNs. Similarly, an auto-zoning mechanism may allow users to group a set of hosts or a set of controllers in a single zone. For instance, some examples of auto-zoning (guidance) policies include: one zone per host, one zone per host bus adapter (HBA), one zone per storage cluster, one zone per storage controller type, etc.

The guidance policy based approach helps to address the problem of a user inadvertently allowing a wrong host to see the wrong storage or accidentally omitting a host from seeing the required storage. However, an approach or mechanism does not currently exist that enforces best practices to ensure that the devices in a zone are operating correctly. In accordance with an illustrative embodiment, a mechanism is provided that validates whether automatically generated zones violate known best practices using validation policies.

Figure 3:
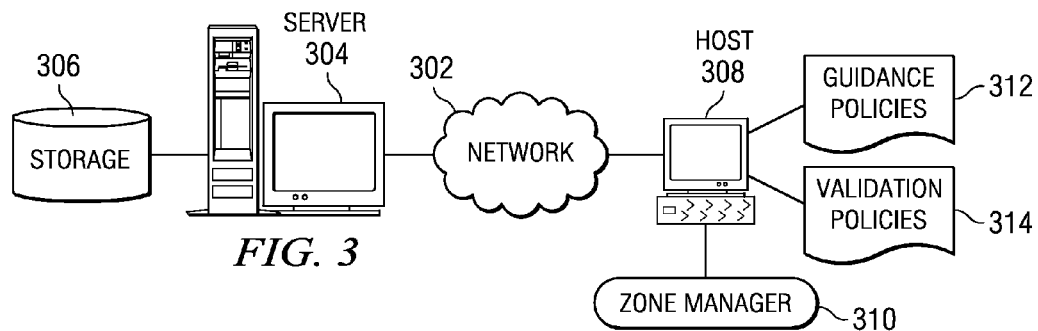
FIG. 3 shows a configuration for applying guidance and validation policies to automatically generate a zone that satisfies best practices in accordance with an illustrative embodiment.

FIG. 3 shows a configuration for applying guidance and validation policies to automatically generate a zone that satisfies best practices in accordance with an illustrative embodiment. Host 308 is a computing device within the storage area network (SAN) that a user may use to configure the zoning for the SAN. For example, host 308 may be one of application blades 110-120 in FIG. 1. Host 308 may automatically retrieve zoning best practices policies from storage 306 at server 304. Storage 306 may be a centralized repository of zoning best practices.

SAN control management host 308 may be connected to server 304 through network 302, which may be an in-band network within the SAN or an out-of-band network. As an out-of-band network, network 302 may be the Internet with network 302 representing a worldwide collection of networks and gateways that use the Transmission Control Protocol/Internet Protocol (TCP/IP) suite of protocols to communicate with one another. Of course, the distributed network 302 may also be implemented to include a number of different types of networks, such as for example, an intranet, a local area network (LAN), a wide area network (WAN), or the like. SAN control management host 308 stores the retrieved best practices policies as validation policies 314.

A user may select a set of hosts and storage controllers and a guidance policy from guidance policies 312 for creating a zone. The user may then select a set of validation policies from validation policies 314 that must be enforced on the zone to ensure that the zone satisfies best practices policies. If the user selects a guidance policy and a set of validation policies that are incompatible, host 308 allows the user to change either the selected guidance policy or the selected validation policies.

If the user selects consistent-zoning as a guidance policy, then host 308 automatically selects a guidance policy from guidance policies 312 that does not violate the known validation policies 314. Furthermore, the SAN control management host 308 allows for a varying set of validation policies. That is, users may dynamically add new policies or remove existing policies, and the zone planning code in SAN control management host 308 does not have to be recompiled in order to leverage the new best practices defined in validation policies 314.

After a zone plan is proposed, i.e. a guidance policy and a set of validation policies are selected that are compatible, SAN control management host 308 creates the zone through a zone creation module within zone manager 310. SAN control management host 308 also allows a user to create alerts that get triggered if any of the zone members are removed from the zone or if new members are added to the zone.

Figure 4:
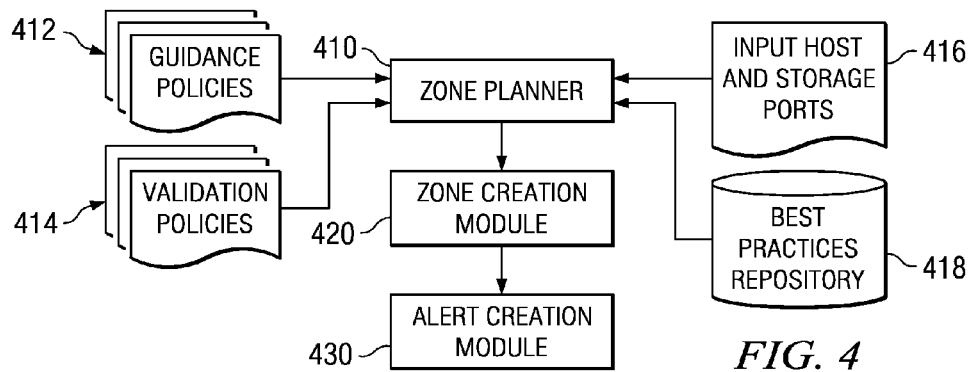
FIG. 4 shows a functional block diagram of a mechanism for automatically retrieving zoning best practices from a centralized repository and ensuring that automatically generated zones do not violate these best practices in accordance with an illustrative embodiment.

FIG. 4 shows a functional block diagram of a mechanism for automatically retrieving zoning best practices from a centralized repository and ensuring that automatically generated zones do not violate these best practices in accordance with an illustrative embodiment. Zone planner 410 contacts a repository of best practices 418 to load in the latest best known practices as validation policies 414. This itself may be policy driven. That is, zone planner 410 may load validation policies 414 on a periodic basis or for each invocation of the zone planner 410 to plan a new zone.

Zone planner 410 receives as input a list of hosts and storage ports 416. Zone planner 410 then looks at a selected guidance policy 412 and uses the selected guidance policy 412 and selected validation policies 414 to propose a zone. Zone planner 410 then takes the set of ports in the proposed zone and checks whether any of the selected validation policies 414 are being violated. If any validation policies 414 are being violated, zone planner 410 informs the users and requests them to change the selections of guidance policies 412 and/or validation policies 414.

If the user selects consistent-zoning as the desired guidance policy, then zone planner 410 iteratively chooses each guidance policy from a list of applicable guidance policies 412 and tries to determine which of the selected validation policies are being violated. Once zone planner 410 finds a combination that does not violate any of the selected validation policies 414, zone planner 410 gives that combination as the output to a user. Zone planner 410 iteratively may select, for example, guidance policies from the largest zone granularity to the smallest zone granularity. For instance, zone planner 410 may select the cluster based zoning guidance policy first, then the host based guidance policy, then the host bus adapter based guidance policy, and so on.

After attempting various guidance/validation policy combinations or after iteratively trying all guidance policies in consistent-zoning, if a combination of valid guidance and validation policies does not exist, then zone planner 410 may propose different options to the user. That is, for the selected set of resources, zone planner 410 may propose one or more combinations of compatible guidance and validation policies. The user may then select one of the possible combinations.

When the user identifies a compatible combination of a guidance policy 412 and a set of validation policies 414, the user may decide to realize this plan. Zone planner 410 then automatically creates the zone using zone creation module 420. After the successful creation of the zone, alert creation module 430 may prompt the users as to whether they would like for alert creation module 430 to create zone alerts. These alerts would get raised if a zone member is added or removed from the zone. The addition or removal of zone members may be monitored via in-band or out-of-band fabric agents. Fabric agents are known in the art and not part of this disclosure.

Figure 5:
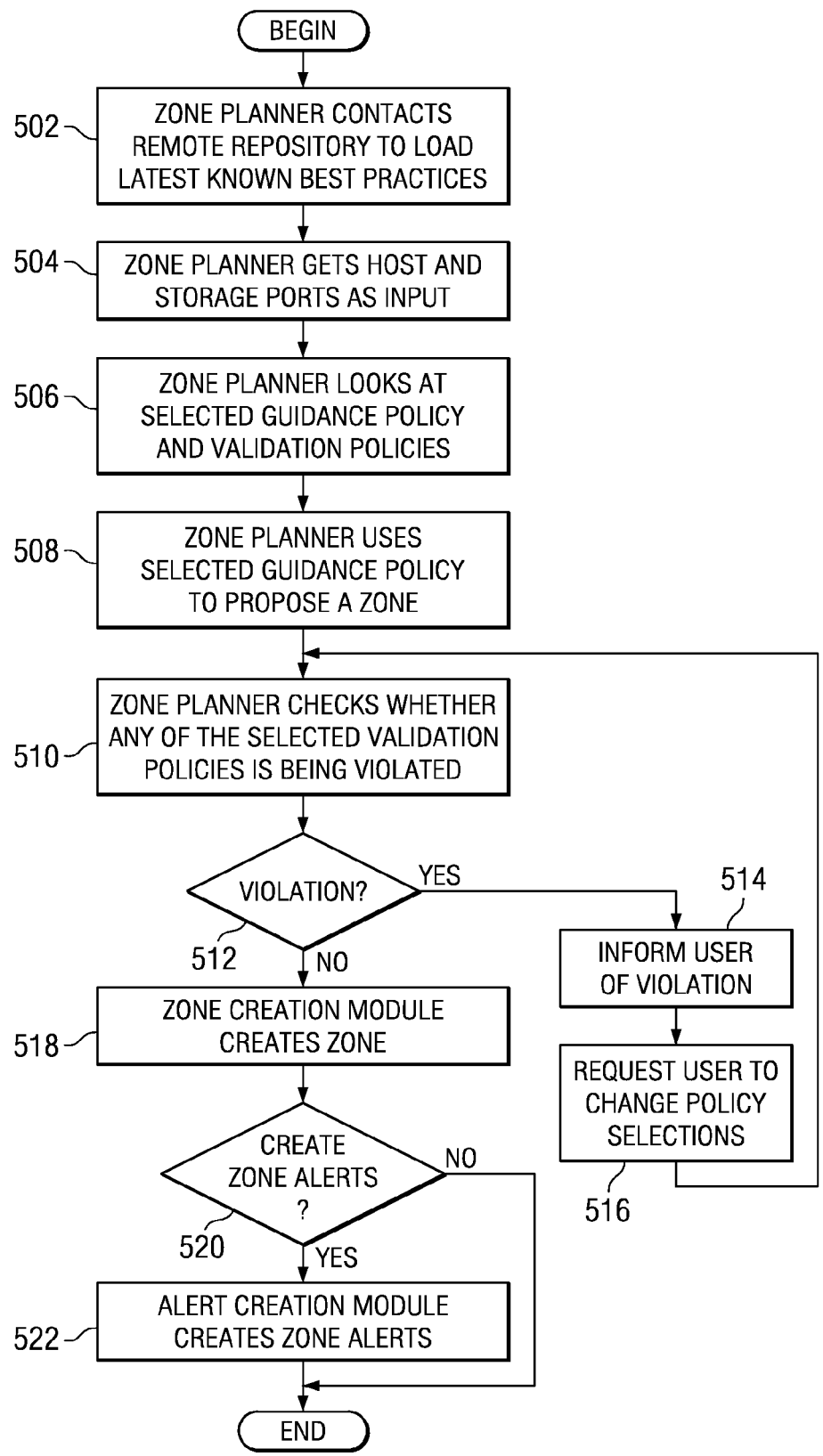
FIG. 5 is a flowchart illustrating operation of an automatic policy based zone creation mechanism in accordance with an illustrative embodiment.

FIG. 5 is a flowchart illustrating operation of an automatic policy based zone creation mechanism in accordance with an illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

With reference now to FIG. 5, operation begins and the zone planner contacts a remote repository to load the latest known best practices (block 502). The zone planner gets the host and storage ports as input (block 504) and looks at the selected guidance policy and validation policies (block 506). The zone planner then uses the selected guidance policy to propose a zone (block 508). Next, the zone planner checks whether any of the selected validation policies are being violated (block 510).

The zone planner determines whether there is a violation (block 512). If any of the validation polices are being violated, the zone planner informs the user of the violation (block 514) and requests the user to change the policy selections (block 516). Then, operation returns to block 510 where the zone planner checks whether any of the selected validation policies is being violated.

If none of the validation policies is being violated in block 512, the zone creation module creates the zone (block 518). Then, the mechanism determines whether the user wishes to create zone alerts (block 520). If the user does not wish to create zone alerts, operation ends. If the user does wish to create zone alerts in block 520, the alert creation module creates zone alerts (block 522), and operation ends.

Figure 6:
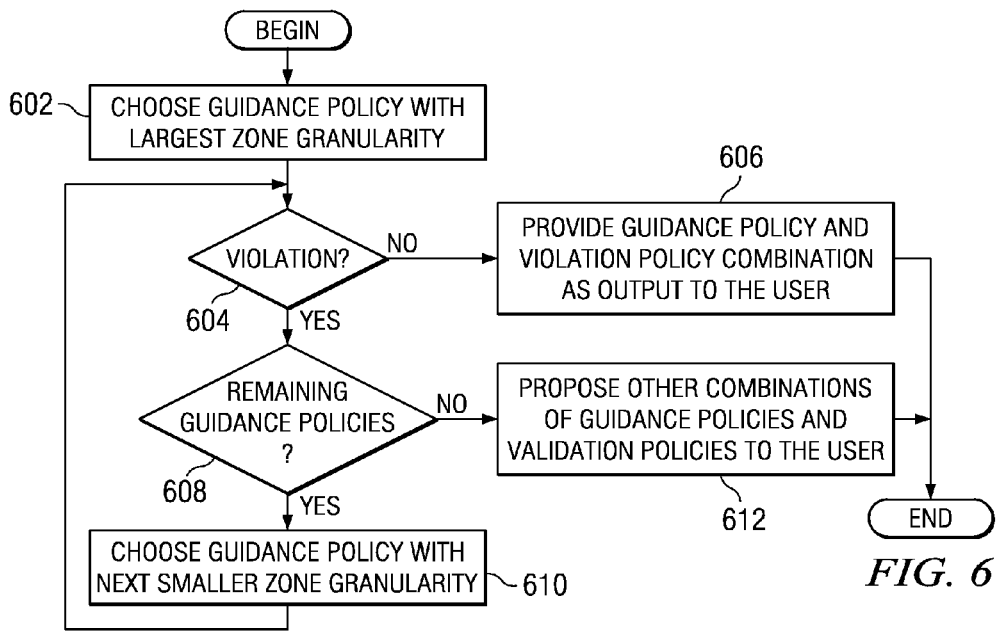
FIG. 6 is a flowchart illustrating operation of an automatic policy based zone creation mechanism using a consistent-zoning guidance policy in accordance with an illustrative embodiment.

FIG. 6 is a flowchart illustrating operation of an automatic policy based zone creation mechanism using a consistent-zoning guidance policy in accordance with an illustrative embodiment. Operation begins when a user selects a set of validation policies and chooses to use a consistent-zoning guidance policy. The zone planner chooses a guidance policy with a largest zone granularity (block 602). The zone planner determines whether any of the validation polices are being violated (block 604). If none of the validation polices are being violated, the zone planner provides the guidance policy and validation policy combination as output to the user (block 606), and operation ends.

If any of the validation policies are being violated in block 604, the zone planner determines whether there are any remaining guidance policies (block 608). If there are remaining guidance polices to try, the zone planner chooses a guidance policy with the next smaller zone granularity (block 610), and operation returns to block 604 to determine whether any of the validation policies is being violated. If there are no remaining guidance policies in block 608, the zone planner proposes other combinations of guidance policies and validation policies that do not result in a violation, if any, to the user (block 612). The user may then select one of the proposed combinations to automatically create a zone. Thereafter, operation ends.

Thus, the illustrative embodiments solve the disadvantages of the prior art by providing a mechanism to automatically retrieve zoning best practices from a centralized repository and to ensure that automatically generated zones do not violate these best practices. A user selects a set of hosts and storage controllers. The user also selects a guidance policy for creating the zone, and also selects a set of validation policies that must be enforced on the zone. If the user selects a guidance policy and a validation policy combination that is incompatible, the mechanism allows the user to change either the selected guidance policy or the set of validation policies. If the user has selected consistent-zoning as a guidance policy, then the mechanism automatically selects a guidance policy that does not violate the known validation policies.

Furthermore, the mechanism allows a varying set of validation policies. That is, users may dynamically add new policies or remove existing policies. The zone planning code does not have to be recompiled in order to leverage the best practices. After a zone plan is proposed and the mechanism creates the zone, an alert module may automatically create alerts that get triggered if any of the zone members are inadvertently removed from the zone, or new zone members get added to the zone.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer storage device having a computer readable program stored thereon, wherein the computer readable program, when executed on a computing device, causes the computing device to:
    receive, by a zone planner in a storage area network, a list of host ports and storage ports in the storage area network;
    receive, by the zone planner, a selection of a set of validation policies;
    receive, by the zone planner, a selection of a guidance policy for automatically
    creating a zone in the storage area network, wherein the selected guidance policy is a consistent-zoning policy;
    choosing, by the zone planner, a guidance policy with a largest zone granularity;
    determine, by the zone planner, whether a zone created using the guidance policy with the largest zone granularity violates any of the set of validation policies based on the list of host ports and storage ports; and
    responsive to a determination that none of the validation policies are violated, automatically create, by the zone planner, the zone in the storage area network using the selected guidance policy;
    responsive to a determination that at least one of the validation policies is violated, choosing a guidance policy with a next smaller zone granularity; and
    determining whether a zone created using the guidance policy with the next smaller zone granularity violates any of the set of validation policies based on the list of host ports and storage ports.

2. The computer storage device of claim 1, wherein the computer readable program, when executed on the computing device, further causes the computing device to:
    responsive to a determination that at least one of the validation policies is violated, request a user to change the selection of the set of validation policies or the selection of the guidance policy.

3. The computer storage device of claim 1, wherein the computer readable program, when executed on the computing device, further causes the computing device to:
    repeat choosing a guidance policy with a next smaller zone granularity and determining whether a zone created using the guidance policy with the next smaller zone granularity violates any of the set of validation policies based on the list of host ports and storage ports until a guidance policy and validation policy combination is found that does not result in a violation.

4. The computer storage device of claim 3, wherein the computer readable program, when executed on the computing device, further causes the computing device to:
    responsive to a determination that a guidance policy and validation policy combination that does not result in a violation cannot be found, propose other combinations of guidance policies and validation policies for selection by a user.

5. The computer storage device of claim 1, wherein the computer readable program, when executed on the computing device, further causes the computing device to:
create zone alerts for the created zone.

6. A data processing system, comprising:
a processor; and
a memory coupled to the processor, wherein the memory contains instructions which, when executed by the processor, cause the processor to:
receive a list of host ports and storage ports in a storage area network; receive a selection of a set of validation policies;
receive a selection of a guidance policy for automatically creating a zone in the storage area network, wherein the selected guidance policy is a consistent-zoning policy;
choosing a guidance policy with a largest zone granularity;
determine whether a zone created using the guidance policy with the largest zone granularity violates any of the set of validation policies based on the list of host ports and storage ports;
responsive to a determination that none of the validation policies are violated, automatically create the zone in the storage area network using the selected guidance policy;
responsive to a determination that at least one of the validation policies is violated, choosing a guidance policy with a next smaller zone granularity; and
determining whether a zone created using the guidance policy with the next smaller zone granularity violates any of the set of validation policies based on the list of host ports and storage ports.

7. The data processing system of claim 6, wherein the instructions further cause the processor to:
responsive to a determination that at least one of the validation policies is violated, request a user to change the selection of the set of validation policies or the selection of the guidance policy.

8. The data processing system of claim 6, wherein the instructions further cause the processor to:
repeat choosing a guidance policy with a next smaller zone granularity and determining whether a zone created using the guidance policy with the next smaller zone granularity violates any of the set of validation policies based on the list of host ports and storage ports until a guidance policy and validation policy combination is found that does not result in a violation.

9. The data processing system of claim 8, wherein the instructions further cause the processor to:
responsive to a determination that a guidance policy and validation policy combination that does not result in a violation cannot be found, propose other combinations of guidance policies and validation policies for selection by a user.

10. The system of claim 6, wherein the instructions further cause the processor to:
create zone alerts for the created zone.

11. A method for zoning a storage area network, the method comprising:
receiving, by a zone planner in a storage area network, a list of host ports and storage ports in a storage area network;
receiving, by a zone planner, a selection of a set of validation policies;
receiving, by a zone planner, a selection of a guidance policy for automatically creating a zone in the storage area network, wherein the selected guidance policy is a consistent-zoning policy;
choosing, by a zone planner, a guidance policy with a largest zone granularity;
determining, by a zone planner, whether a zone created using the guidance policy with the largest zone granularity violates any of the set of validation policies based on the list of host ports and storage ports;
responsive to a determination that none of the validation policies are violated, automatically creating, by a zone planner to automatically create by the execution of zone planner software, the zone in the storage area network using the selected guidance policy;
responsive to a determination that at least one of the validation policies is violated, choosing a guidance policy with a next smaller zone granularity; and
determining whether a zone created using the guidance policy with the next smaller zone granularity violates any of the set of validation policies based on the list of host ports and storage ports.

12. The method of claim 11, further comprising:
responsive to a determination that at least one of the validation policies is violated, requesting a user to change the selection of the set of validation policies or the selection of the guidance policy.

13. The method of claim 11, further comprising:
repeating choosing a guidance policy with a next smaller zone granularity and determining whether a zone created using the guidance policy with the next smaller zone granularity violates any of the set of validation policies based on the list of host ports and storage ports until a guidance policy and validation policy combination is found that does not result in a violation.

14. The method of claim 13, further comprising:
responsive to a determination that a guidance policy and validation policy combination that does not result in a violation cannot be found, proposing other combinations of guidance policies and validation policies for selection by a user.

15. The method of claim 11, further comprising:
creating zone alerts for the created zone.

* * * * *